Sept. 8, 1959     R. W. HUGHES ET AL     2,902,833
APPARATUS FOR SEPARATING GASES
Filed June 6, 1955
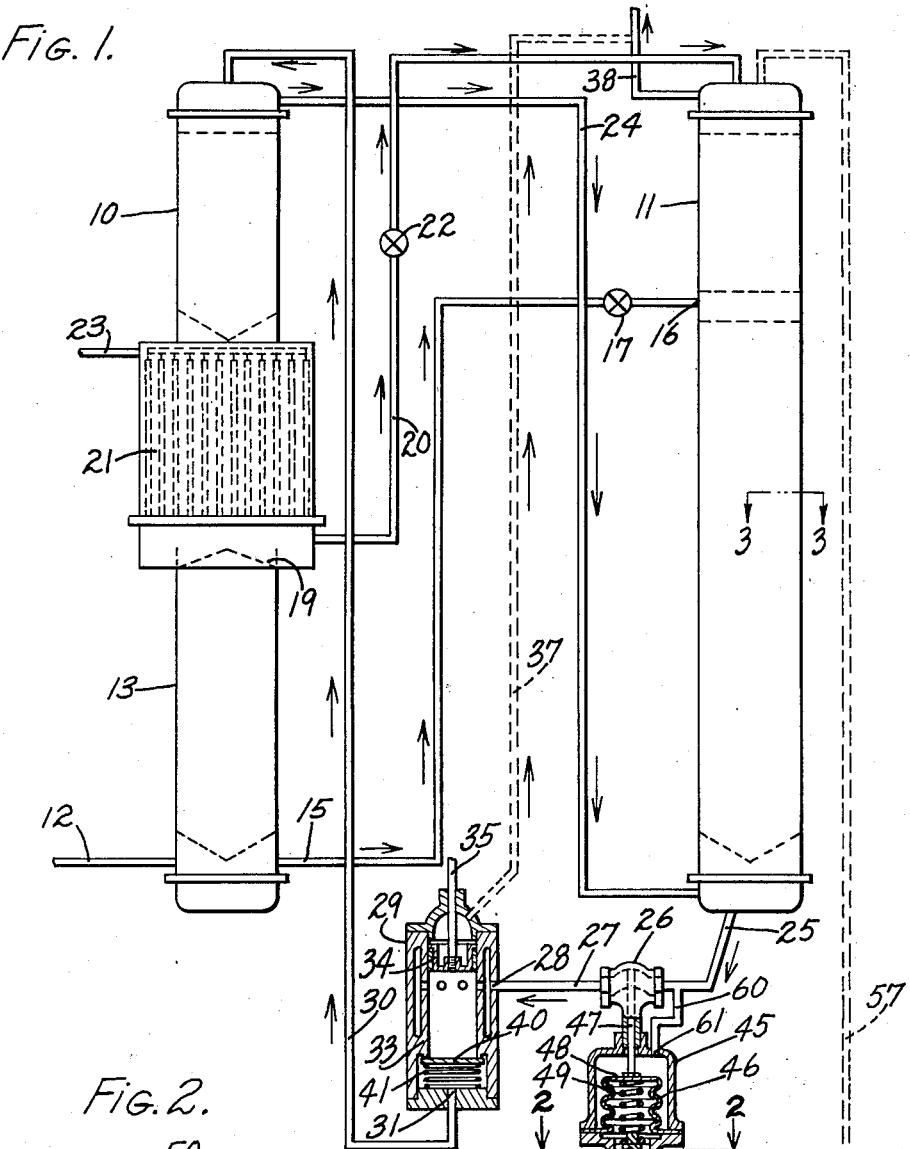
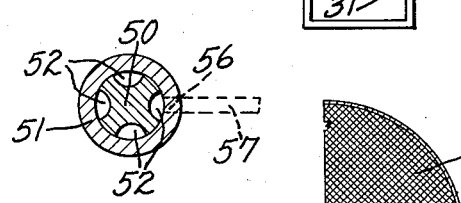
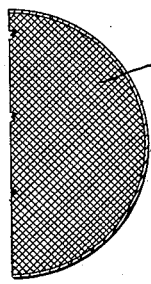
INVENTORS
ROBERT W. HUGHES
SAMUEL C. COLLINS
BY Terrell S. Ruhlman
ATTORNEY United States Patent Office 2,902,833
Patented Sept. 8, 1959

2,902,833
APPARATUS FOR SEPARATING GASES

Robert W. Hughes, Michigan City, Ind., and Samuel C. Collins, Watertown, Mass., assignors to Joy Manufacturing Company, Pittsburgh, Pa., a corporation of Pennsylvania Application June 6, 1955, Serial No. 513,269

7 Claims. (Cl. 62—37)

This invention relates to the separation of gases into their constituents and especially to a rectification apparatus and methods for that purpose. More particularly the present invention relates to apparatus for and a method of controlling the flow of liquid between packed columns in a sectional type and especially a so-called two column rectification unit to produce a product of high purity.

In designing and constructing gas separating apparatus, there frequently occur circumstances requiring that the overall height of the apparatus be kept to a minimum. In such instances the conventional vertical rectification column can not be used because of its great height, and it becomes necessary therefore to use a sectional rectification unit to meet the requirements for a reduced height. When a sectional rectification unit is used, the columns are so connected that the basic flow of components therethrough is the same as if the unit comprised a single vertical column, i.e. the gas flowing upwardly through one column is delivered from the upper end thereof to the lower end of the next column, while the liquid trickling downwardly through one of the columns is delivered from the lower end of the latter to the upper end of the preceding column. It has been found, in using such a multiple column rectification arrangement for producing as an end product, a component of the mixture of gases being separated, as for example in an oxygen generating system such as is disclosed in Patent No. 2,667,044 issued January 26, 1954 to Dr. Samuel C. Collins, that when large diameter packed columns are used, the normal pressure drop across the second of the column sections is not sufficient to consistently produce a high purity product. In taking advantage of the sectional feature of a rectification unit, it has been found that by inducing a controllable loaded condition in the second column which is attended by an increased pressure drop thereacross, it is possible to consistently produce a high purity product. It will be understood by those skilled in the art that inducing a loaded condition in a column as used herein refers to the building up of and the maintenance of a quantity of liquid within the column and that the substantially increased pressure drop across the column is occasioned by the fact that the gases flowing upwardly through the column flow through a more restricted path due to the increased liquid content within the column.

It is therefore a primary object of the present invention to provide a novel apparatus for and method of making use of the above mentioned principle. It is a more specific object of the invention to provide an apparatus for and a method of controlling the flow of the product component enriched liquid from one of the columns to a preceding column, to induce a loaded condition in said one of the columns, with the resulting predetermined pressure drop across the latter column being used to regulate the loading in the column.

In the preferred embodiment of the invention, which will be described in connection with the separation of air to produce an oxygen product of high purity, although it will be understood that the method and apparatus can be used equally as well in separating other mixtures of gases, there is provided a two column rectification unit with means for delivering nitrogen-rich and oxygen-rich streams of liquid from the first column to the upper part of the second column, the latter stream at a lower point than the other, a gaseous mixture from the upper end of the first column to the lower end of the second column, and means for removing nitrogen-rich waste gases from the upper end of the second column, with suitable means also being provided for controlling the flow of oxygen-rich liquid from the lower end of the second column to the upper end of the first column. A liquid transfer pump is placed in the last mentioned flow line to pump the oxygen-rich liquid from the second column to the first with a valve also being placed in the line ahead of the transfer pump to control the amount of loading in the second column by regulating the flow of liquid from the lower end of the second column to the transfer pump. A spring loaded expansible bellows having its closed end wall connected to the stem of the aforementioned valve is positioned in a chamber. The outer surface of the bellows is subjected to the pressure of liquid in the transfer line and the interior of the bellows is subjected to the pressure at the upper end of the second column, i.e. the pressure of the nitrogen-rich waste gases flowing outwardly through the top of the second column. Means are desirably provided for changing the tension on the spring loaded bellows to thus vary the amount of the loading of the second column to regulate the degree of purity of the product oxygen.

Although, as aforementioned, in a preferred embodiment of the invention there is illustrated and described a positive acting liquid transfer pump and a spring-loaded bellows-controlled valve for controlling the flow of the oxygen-rich liquid from the second column to the pump, it should be understood that the main concept of the invention lies in the fact that the sectional feature of the rectification unit can be used to induce loading in one of the column sections to regulate the rectification therein and maintain the resulting end product of a high degree of purity, regardless of the means which is used to attain the induced loading in the column section. For example other means might be used to regulate the flow of product-rich liquid between the columns to effect the induced loading in the column, such as a variable speed pump, a variable displacement pump, an overflow tube in the second column, etc.

Other objects and advantages will become apparent from the following more detailed description of my invention when read in conjunction with the attached drawing in which:

Fig. 1 shows a double column sectional rectification unit incorporating my improved means for controlling the flow of liquid between the columns;

Fig. 2 is an enlarged horizontal sectional view taken on the plane of line 2—2 on Fig. 1; and Fig. 3 is an enlarged sectional view taken on the plane of line 3—3 on Fig. 1.

Referring now specifically to the drawing, there is shown a double column rectification unit, although it will be understood that the invention would be applicable to a single column unit, consisting of two substantially vertical sections of approximately equal height indicated generally by the reference numerals 10 and 11. Section 10 may be if desired, and is shown as comprising, the first or high pressure stage of a double column and a part of the second or low pressure stage, while section 11 shows what would normally be, if the unit consisted of one column, the upper portion of the low pressure stage.

As packed columns of this general type are well known by those skilled in the art, a detailed description of them is not warranted herein. The packing in the column may be one of several types of conventional packing materials such as fine wire mesh designated 70 in Fig. 3. Also, it should be understood that although the invention is illustrated and described in connection with a two section column, it would have application as well where it were desirable to use a column having more than two sections. A conduit 12 is connected to the lower end of the high pressure section or lower column portion 13 of column 10 to deliver mixed gases at pressures substantially above atmospheric, as will be understood by those skilled in the art, to the rectification unit. Although it will also be understood by those skilled in the art that mixtures of gases other than air can be separated in a rectification unit of the type disclosed herein, reference will be made to the rectification of an air mixture, with the conduit 12 delivering to the column 10 substantially clean air generally containing at least some liquid.

A conduit 15 is connected between the lower end of the high pressure portion 13 of column 10 and a point 16 intermediate the ends of column 11. It will be understood by those skilled in the art that the point 16 at which the conduit 15 connects with the column 11 is at a point where the downward trickling liquid is of substantially the same composition as the oxygen-rich liquid air which is being delivered through conduit 15. Inasmuch as the upper end of column 11 is at a substantially lower pressure than the lower column portion 13, conduit 15 is provided with suitable means, such as an expansion valve 17, to throttle the flow of the liquid air from the high pressure portion of the column 10 to reduce its pressure to the considerably lower pressure of the column 11.

A conduit 20 connects the upper end of the second column 11 with a point in the first column 10 just above a nitrogen shelf 19. Nitrogen-rich liquid is delivered through the conduit 20, the latter also being provided with an expansion valve 22 to reduce the pressure of the liquid from the higher pressure of portion 13 of column 10 to the lower pressure of column 11. Oxygen product is delivered from column 10 adjacent the upper end of boiler condenser 21 through a conduit 23 which connects with the column for that purpose.

A conduit 24 connects the upper end of column 10 with the lower end of column 11 to thus provide a continuous path through the columns for the gaseous mixture. As the upper end of column 10 is at only a slightly greater pressure than the lower end of column 11, it is not necessary to provide an expansion valve in conduit 24, the difference in pressure being only great enough to effect the gas flow at a desired rate.

Oxygen-rich liquid which trickles down through column 11 flows out from the lower end of the column through a conduit 25. Conduit 25 is the initial portion of a system for the controlled delivery of oxygen enriched liquid to the upper end of the column section 10, and this controlled delivery system has incorporated in it suitable means controlled by the differential in pressure between the top and bottom of column section 11. While such means may take various forms as aforementioned, there is illustrated a positive displacement pump with variably throttled intake under the control of the pressure differential mentioned. Conduit 25 connects at its end remote from the column section 11 with the casing of a valve 26. Valve 26 is of a conventional sliding type in which downward movement opens it and upward movement closes it. A conduit 27 is provided between the valve 26 and the inlet port 28 of a liquid transfer pump 29, while a conduit 30 connects the discharge port 31 of the transfer pump with the upper end of the column 10. Pump 29 may be of any conventional type, the one illustrated in the drawing comprising a cylinder 33 and a piston 34 reciprocable therein by any suitable drive means, not shown, connected to the piston rod 35. The pump is vented by means of a suitable conduit 37 connecting with the conduit 38 through which the nitrogen-rich waste gases flow from the upper end of column 11. A circular valve 40 is biased upwardly by means of a spring 41 to normally close the lower end of cylinder 33 and prevent flow through the discharge port 31 therein from conduit 30 to the pump. On the downward or discharge stroke of the piston 34 the liquid trapped between the latter and the valve 40 is subjected to a pressure great enough to overcome the force exerted by the spring 41, at which time the liquid is discharged through port 31, conduit 30 and into the top of column 10.

It has been found that with the liquid flowing freely from the bottom of column 11 to the transfer pump 29, i.e. with the transfer pump moving all of the liquid into the column 10 as rapidly as it reaches the lower end of column 11, the normal pressure drop across the column 11, i.e. from bottom to top as shown in the drawing, is very small and the oxygen-rich liquid flowing from column 11 is not of that degree of purity which is normally desired. It has been found, however, that by restricting the flow of liquid from the lower end of column 11 and in the presently illustrated embodiment of the invention by controlling the flow of liquid to the transfer pump by means of a valve such as that indicated at 26 and the control means which we shall now describe, a loaded condition is induced in column 11 attended by a substantially increased pressure drop across the column, with the resulting oxygen product being of a higher purity.

The control means for valve 26 comprises a housing 45 and a bellows 46 positioned in the chamber formed by the housing. Valve stem 47 of valve 26 has its free end secured to the closed end wall 48 of the bellows with the lower end of the bellows being secured to the housing 45 by any suitable means. The bellows 46 is spring loaded by means of a spring 49 the upper end of which abuts the end wall 48 of the bellows and the lower end of which rests on a circular disc 50, the latter fitting closely in the annular neck portion 51 of the housing 45. Disc 50 is provided with a plurality of openings 52 (Fig. 2) adjacent its outer periphery and is supported within the housing for vertical adjustment by means of a set screw 53 which is threaded through the lower end wall 54 of the neck portion 51 of the housing. An opening 56 is provided in the housing neck portion 51 with a conduit 57 connecting opening 56 with the upper end of column 11. It can thus be seen that the interior of bellows 46 is subjected to the pressure of the upper end of column 11 through the open communication of conduit 57 and openings 56 and 52.

The outside of bellows 46, on the other hand, is subjected to the liquid pressure in the bottom of column portion 11 through the conduit 25. A conduit 60 connects with the conduit 25 and an opening 61 in the housing 45 for this purpose. It will be understood of course that other means could be provided for admitting the fluid pressure in conduit 25 to the outer surface of the bellows, as for example by grooving the valve stem 47 to provide communication between conduit 25 and the chamber 45 through the value casing.

In the operation of the control mechanism above described, after the amount of liquid loading in column 11 which will effect the necessary rectification action within the column to produce the desired degree of purity of the oxygen enriched liquid flowing from the bottom of column 11 has been determined, the control means for valve 26 is set so as to maintain this desired amount of loading in the column. The valve control means is set by turning the adjusting screw 53 in a clockwise or counter-clockwise direction to either increase the compression of the spring 49 or decrease the same to thus cause movement of the valve stem 47 in an upward direction to decrease the amount of opening of valve 26 or permit the valve to be more easily moved in a downward direction to increase the opening of valve 26. The induced loaded condition in column 11 is accompanied by an increased pressure drop across the column over that pressure drop which is present when there is no appreciable loading in the column. With the bellows 46 being subjected externally to the pressure in the bottom of the column, it can be seen that the amount of opening of valve 26 and therefore the amount of liquid which is pumped from column 11 can be controlled by the change in pressure drop across the column which accompanies variations in the amount of induced loading in the column.

It will be readily understood that once there is provided in column 11 the amount of induced loading, or in other words that amount of liquid is built up in the column, which results in the desired degree of purity of the exygen enriched liquid being produced, all of the liquid which is formed for any given period in column 11 will be pumped from that column to the upper end of column 10, with the setting of valve 26 remaining the same. However if the liquid level in the column 11 were to drop, the decrease in pressure acting on the exterior of the bellows would result in the bellows expanding upwardly and at the same time moving valve stem 47 in an upward direction, as viewed in Fig. 1, to thus gradually close valve 26 and thus reduce the flow of liquid to the liquid transfer pump 29. As the liquid build-up in the bottom of column 11 increased and the corresponding pressure drop across the column increased, the pressure on the exterior of the bellows would increase due to the increased pressure in the lower end of the column, to thus cause the bellows to contract and valve 26 to be gradually opened. When the pressure which acts externally on the bellows is lessened to the extent that the force acting internally on the bellows prevents further downward movement of the valve, the opening of the latter is brought back to the predetermined mark to restrict the flow of liquid through the valve to induce that amount of loading in column 11 which effects the desired predetermined purity of the oxygen enriched liquid flowing from the column.

On the other hand, if liquid were to build up in column 11 above that required for the predetermined amount of loading and the resultant pressure drop across the column to increase, the pressure acting on the outside of the bellows would increase, thus causing the bellows to gradually open wider valve 26 and allow more liquid to be delivered from the lower end of column 11. As the liquid level in the column started to drop and the pressure drop across the column was correspondingly reduced, there would be a gradual closing of valve 26 due to the decreased pressure in the lower end of the column acting on the outside of the bellows, until equilibrium was reached. If at any time it is desired to change the degree of purity of the product oxygen, the amount of induced loading in the column can be varied by adjusting the set screw 53 to change the tension in spring 49 and bellows 46 to vary the flow of liquid through valve 26.

It can be seen from the above description that there is provided a novel apparatus for and method of producing a high purity oxygen product by controlling an induced loaded condition in one of the columns in a sectional rectification unit. While there is in this application specifically described one form which the invention may assume in practice, it will be understood that this form of the same is shown for purposes of illustration and that the invention may be modified and embodied in various other forms without departing from its spirit or the scope of the appended claims.

What we claim is:

1. In an apparatus for separating a mixture of gases to provide one component thereof as a nearly pure product, a packed multiple column rectification unit, one column of which comprises a higher pressure portion and a lower pressure portion and the second column of which comprises only a lower pressure portion, means for delivering a mixture of said gases to the high pressure portion of said rectification unit, means connecting said columns for delivering a second stream of a mixture of said gases from the lower pressure portion of said first mentioned column to the lower end of the second column, means connecting said columns for delivering a liquid stream of said mixture of gases from the higher pressure portion of said first column to said second column, a further means connected to said second column for delivering a stream of a second component enriched gases from said second column, means for delivering a liquid stream enriched with said first mentioned component from the lower end of said second column to the lower pressure portion of said first column, and means coordinated with the pressure drop across said second column and operative on said last mentioned stream to control the flow of same.

2. In an apparatus for separating a mixture of gases to provide at least one component thereof as a nearly pure product, a packed multiple column unit comprising one part having a higher pressure portion and a lower pressure portion and a second part which has only a lower pressure portion, means for delivering the mixture to the higher pressure portion, means for delivering a liquid stream enriched with said first component from said higher pressure portion of said first part to a point near the upper end of said second part, means for delivering a nearly pure stream of a second component from said higher pressure portion to the top of said second part, means for delivering a second stream of a mixture of said gases from the top of the lower pressure portion of said first part to a point near the bottom of said second part, and means for delivering liquid further enriched with the first component from the bottom of said second part to top of the lower pressure portion of said first part including means governed by the pressure drop across said second part for governing the rate of delivery of said last mentioned stream.

3. In an apparatus for separating a mixture of gases to provide one component thereof as a nearly pure product, a packed multiple column rectification unit, one column of which comprises a high pressure portion and a lower pressure portion and the second column of which comprises only a lower pressure portion, conduit means for delivering a cold mixture of said gases to be separated to said high pressure portion of said first column, conduit means connecting said first and second column for delivering a gaseous stream of said mixture of gases from the lower pressure portion of the first column to the lower end of the second column, means for delivering a liquid stream enriched with said first mentioned component from the lower end of said second column to the upper end of the lower pressure portion of said first column, said last means including a pump, and means responsive to the pressure differential across said second column to meter the flow of said last mentioned liquid to said pump.

4. An apparatus as in claim 3 in which said last means includes a valve and control means for said valve operatively associated with the pressure in the upper end of said second column.

5. In an apparatus for separating a mixture of gases to provide one component thereof as a nearly pure product, a rectification unit having a high pressure portion and a lower pressure portion and in which during operation a mixture of said gases and a liquid mixture of said gases flow in countercurrent relation through said lower pressure portion, means for delivering a stream of a mixture of said gases to be separated to the high pressure portion of said rectification unit, and means responsive to the pressure drop across at least a portion of said lower pressure column portion for maintaining a predetermined quantity of said liquid in at least a part of said lower pressure portion.

6. In an apparatus for separating a mixture of gases to provide one component thereof as a nearly pure product, a packed multiple column rectification unit, one column of which comprises a high pressure portion and a lower pressure portion and the second column of which comprises only a lower pressure portion, conduit means for delivering a cold mixture of said gases to the high pressure portion of said first column, conduit means for delivering a second stream of a mixture of said gases from the lower pressure portion of said first column to the lower end of the second column, means including a further conduit means connected between said first and second column for delivering a liquid stream enriched with said first mentioned component from the lower end of said second column to the upper end of the lower pressure portion of said first column, and means including a valve positioned in said last conduit, and means responsive to the pressure drop across said second column to control said valve to regulate the flow of said last mentioned liquid.

7. In an apparatus for separating a mixture of gases to provide one component thereof as a nearly pure product, a packed multiple column rectification unit, one column of which comprises a high pressure portion and a lower pressure portion and the second column of which comprises only a lower pressure portion, conduit means for delivering a cold mixture of said gases to the high pressure portion of said first column, conduit means for delivering a second stream of a mixture of said gases from the lower pressure portion of said first column to the lower end of the second column, means including a further conduit means connected between said first and second column for delivering a liquid stream enriched with said first mentioned component from the lower end of said second column to the upper end of the lower pressure portion of said first column, means including a valve positioned in said last conduit coordinated with the pressure drop across said second column to control the flow of said last mentioned liquids, said means including an expansible means connected with said valve, and said expansible means being connected to said last mentioned conduit and to said second column and operative upon differences in pressure existing in said last conduit and said second column.

References Cited in the file of this patent
UNITED STATES PATENTS

| | | |
|---|---|---|
| 1,638,005 | Le Rouge | Aug. 2, 1927 |
| 1,773,012 | Schuftan | Aug. 12, 1930 |
| 2,316,056 | De Baufre | Apr. 6, 1943 |
| 2,667,044 | Collins | Jan. 26, 1954 |